(12) United States Patent
Newman

(10) Patent No.: US 10,668,578 B2
(45) Date of Patent: Jun. 2, 2020

(54) SYSTEMS AND METHOD FOR PUSHING A BUSBAR AGAINST A BATTERY CELL USING MAGNETIC FORCE

(71) Applicant: NextEV USA, Inc., San Jose, CA (US)

(72) Inventor: Austin L. Newman, San Jose, CA (US)

(73) Assignee: NIO USA, Inc., San Jose, CA (US)

(*) Notice: Subject to any disclaimer, the term of this patent is extended or adjusted under 35 U.S.C. 154(b) by 170 days.

(21) Appl. No.: 15/492,922

(22) Filed: Apr. 20, 2017

(65) Prior Publication Data
US 2018/0304416 A1    Oct. 25, 2018

(51) Int. Cl.
| | |
|---|---|
| *B23K 26/00* | (2014.01) |
| *B23K 1/00* | (2006.01) |
| *B23K 37/04* | (2006.01) |
| *H01M 2/20* | (2006.01) |
| *B23K 26/21* | (2014.01) |
| *B23K 26/70* | (2014.01) |
| *H01M 2/30* | (2006.01) |
| *H01F 7/06* | (2006.01) |
| *B23K 101/36* | (2006.01) |
| *B23K 101/38* | (2006.01) |

(52) U.S. Cl.
CPC ............... *B23K 37/04* (2013.01); *B23K 26/21* (2015.10); *B23K 26/70* (2015.10); *B23K 37/0426* (2013.01); *H01M 2/20* (2013.01); *H01M 2/202* (2013.01); *H01M 2/30* (2013.01); *B23K 2101/36* (2018.08); *B23K 2101/38* (2018.08); *H01F 7/064* (2013.01); *H01M 2220/20* (2013.01)

(58) Field of Classification Search
CPC .... B23K 2101/36; B23K 26/21; B23K 26/70; B23K 37/04; H01F 7/064; H01M 2/202

USPC ...... 219/121.6–121.66, 56, 56.1, 86.1–86.32
See application file for complete search history.

(56) References Cited

U.S. PATENT DOCUMENTS

| | | | | |
|---|---|---|---|---|
| 3,585,350 | A | * 6/1971 | Voytko | B23K 28/02 219/121.63 |
| 3,853,624 | A | 12/1974 | Brown et al. | |
| 3,983,519 | A | * 9/1976 | Stadigh | B66B 1/50 335/151 |
| 4,321,455 | A | 3/1982 | Hill | |

(Continued)

OTHER PUBLICATIONS

De Jong et al., "Low-Stress Interconnections of Solar Cells," Energy Research Centre of the Netherlands, www.ecn.nl, 2005, 15 pages.

(Continued)

*Primary Examiner* — Sang Y Paik
(74) *Attorney, Agent, or Firm* — Sheridan Ross P.C.

(57) ABSTRACT

Methods and systems for welding a terminal of a battery cell to corresponding terminal tab or busbar are described using a magnet that causes the terminal and tab/busbar to be placed in physical contact. The terminal of a battery cell is aligned in contact with the tab/busbar by the force of a magnetic field. A welder, e.g., a laser welder, can then generate a laser weld beam to weld the terminal of the battery cell to the tab/busbar. Next, the laser weld beam is narrowed, reducing the first diameter to a smaller second diameter. Without touching the tab/busbar or terminal of the battery (which could affect the welding operation), the magnetic field can cause a force that brings the tab and terminal in contact during welding.

20 Claims, 12 Drawing Sheets

(56) References Cited

U.S. PATENT DOCUMENTS

| | | | |
|---|---|---|---|
| 4,835,470 A * | 5/1989 | Novikov | G01N 27/82 |
| | | | 324/213 |
| 5,650,244 A | 7/1997 | Shoji et al. | |
| 6,458,171 B1 | 10/2002 | Tsukamoto | |
| 6,995,333 B2 * | 2/2006 | Nakanishi | H01M 2/263 |
| | | | 219/121.14 |
| 8,456,807 B2 | 6/2013 | Tallam et al. | |
| 2012/0149258 A1 * | 6/2012 | Tartaglia | B23K 11/0033 |
| | | | 439/890 |
| 2015/0303436 A1 * | 10/2015 | Koetting | H01M 2/30 |
| | | | 429/233 |
| 2016/0001427 A1 * | 1/2016 | Evans | B23K 37/047 |
| | | | 219/121.14 |
| 2016/0144449 A1 * | 5/2016 | Matsushita | B23K 11/16 |
| | | | 219/86.32 |

OTHER PUBLICATIONS

Notice of Allowance for U.S. Appl. No. 15/593,705, dated Oct. 11, 2018 7 pages.
U.S. Appl. No. 15/593,705, filed May 12, 2017, Newman et al.
Official Action for U.S. Appl. No. 15/593,705, dated May 3, 2019 8 pages.
Official Action for U.S. Appl. No. 15/593,705, dated Nov. 29, 2019 6 pages.

* cited by examiner

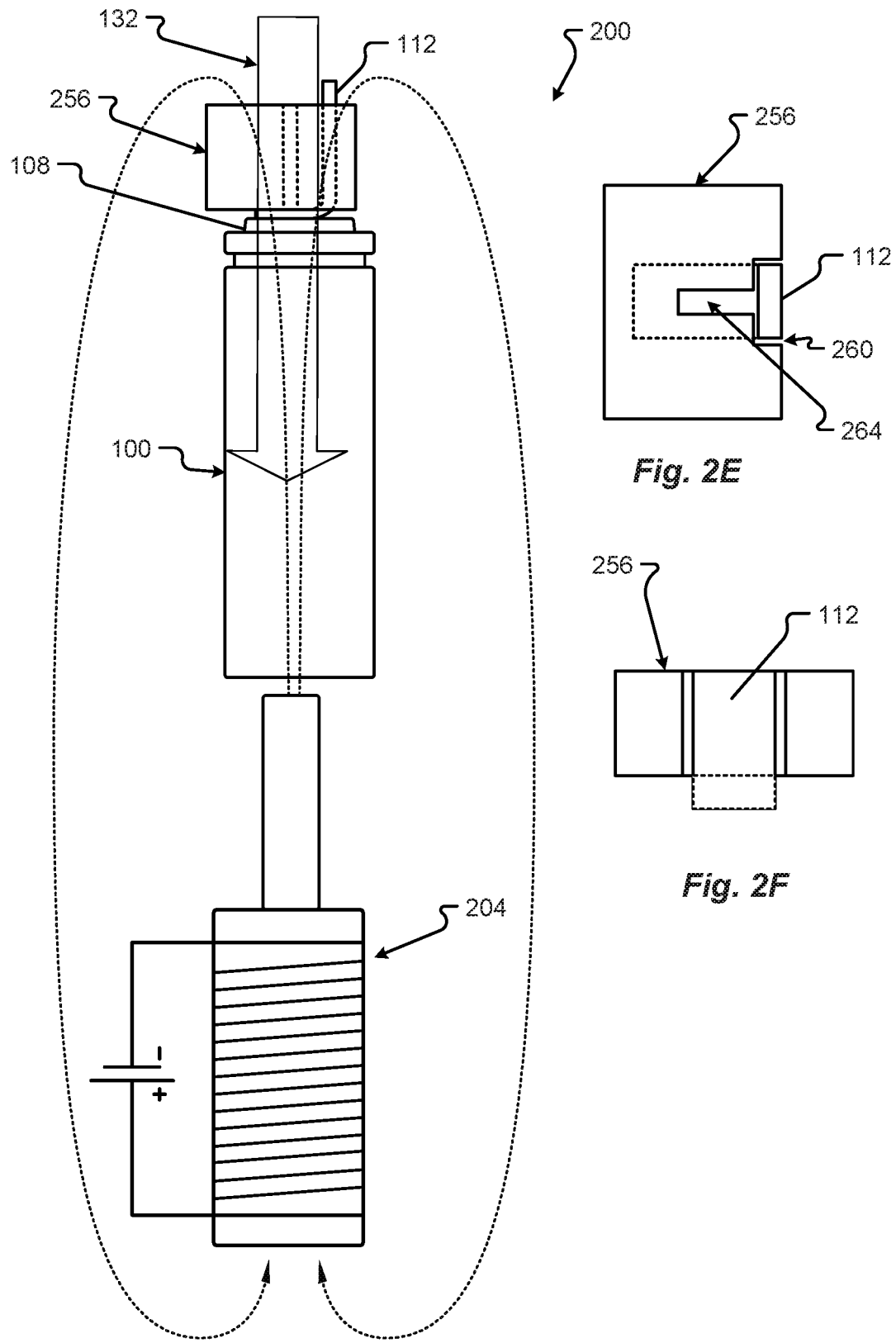

SYSTEMS AND METHOD FOR PUSHING A BUSBAR AGAINST A BATTERY CELL USING MAGNETIC FORCE

FIELD

The present disclosure is generally directed to battery module construction, and more particularly to busbar electrical connections.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

Vehicles employing at least one electric motor and power system store electrical energy in a number of battery cells. These battery cells are typically connected to an electrical control system to provide a desired available voltage, ampere-hour, and/or other electrical characteristics. Advances in battery technology have resulted in the increasing use of large batteries, comprising tens, hundreds, or even thousands of individual cells, for applications such as powering various electrical components of vehicles (including vehicles designed for travel over land and water and through the air) and storing electricity generated using renewable energy sources (e.g. solar panels, wind turbines).

A busbar is used to collect electricity generated by each cell (when the battery is in a discharge state) and route the collected electricity to the battery terminal. The busbar also routes electricity provided via the battery terminal (when the battery is in a recharge state) to the individual terminals of each cell within the battery. For the battery to operate safely and efficiently, the connection between the busbar and the terminal of each cell must be sufficiently secure to remain intact despite any forces resulting from vibration, expansion due to changing temperature, or other conditions to which the battery might be subjected. If a connection between the busbar and the terminal of a cell fails, then the cell will no longer contribute to the proper functioning of the battery. Additionally, if any short circuits are caused by such failure, then the battery could catch fire or otherwise be rendered inoperable and/or unsafe.

BRIEF DESCRIPTION OF THE DRAWINGS

FIG. 2D shows a manufacturing jig being influenced by a magnetic force to force the busbar to contact the battery terminal cell and ready to be welded thereto in accordance with embodiments of the present disclosure;

FIG. 2E shows a manufacturing jig being influenced by a magnetic force to force the busbar to contact the battery terminal cell and ready to be welded thereto in accordance with embodiments of the present disclosure;

FIG. 2F shows a manufacturing jig being influenced by a magnetic force to force the busbar to contact the battery terminal cell and ready to be welded thereto in accordance with embodiments of the present disclosure;

DETAILED DESCRIPTION

Figure 1B:
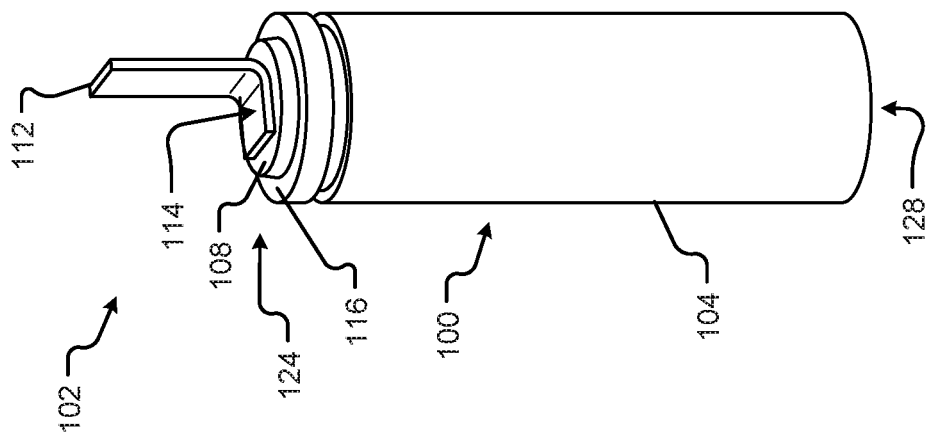
FIG. 1B is a perspective view of a weldable battery cell in accordance with embodiments of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Laser welding is commonly used to secure a busbar to terminals of individual cells in a battery. One of the biggest challenges for laser welding electrical connections is ensuring planar contact between weld surfaces, to achieve a high-quality weld. The need for ensuring planar contact between weld surfaces causes great difficulty when designing for tolerances and avoiding mechanical fixtures for each weld.

Referring now to FIG. 1, a perspective view of a battery cell 100 is shown in accordance with embodiments of the present disclosure. The battery cell 100 may comprise a body 104, a top portion 124, a bottom portion 128, and a first terminal 108 and a second terminal (not visible). In some configurations, the first terminal 108 may correspond to a positive terminal disposed at the top portion 124 of the battery cell 100. In some configurations, the second terminal may correspond to the negative terminal. The second terminal may be disposed opposite the positive terminal (e.g., at the bottom portion 128 of the battery cell 100). In other configurations, the second terminal may be disposed on a side of the battery cell 100 other than the bottom portion 128.

The first terminal 108 may be insulated from the second terminal, or other part of the battery cell 100, via an insulation area 116. The insulation area 116 may be configured to electrically isolate the first terminal 108 from the second terminal, body 104, or other part of the battery cell 100. In some configurations, the insulation area 116 may be made from a plastic, cardboard, paper, linen, composite, or other non-conductive material.

In one embodiment, the battery cell 100 may be substantially cylindrical in shape. Additionally or alternatively, the battery cell 100 may be symmetrical about at least one axis. For example, the battery cell 100 may be substantially symmetrical about a center axis 100 running from the top portion 124 to the bottom portion 128. The battery cell 100 may include one or more manufacturing features 120 including, but in no way limited to, indentations, alignment marks, reference datum, location features, tooling marks, orientation features, etc., and/or the like. As shown in FIG. 1A, the manufacturing feature 120 of the battery cell 100 may be a rolled, or sealed, portion of the battery cell 100 (e.g., disposed near a top portion 124 of the battery cell 100).

In any event, the battery cell 100 may be configured to store energy via one more chemicals contained inside the body 104. In some configurations, the battery cell 100 may be rechargeable and may include one or more chemical compositions, arrangements, or materials, such as, lithium-ion, lead-acid, aluminum-ion, nickel-cadmium, nickel metal hydride, nickel-iron, nickel-zinc, magnesium-ion, etc., and/or combinations thereof. The positive terminal of the battery cell 100 may correspond to the cathode and the negative terminal may correspond to the anode. When connected to the busbar, current from the battery cell 100 may be configured to flow from the terminals of the battery cell 100 through the busbar to one or more components of an electric power distribution system. This current flow may provide power to one or more electrical elements associated with an electric vehicle.

Figure 1A:
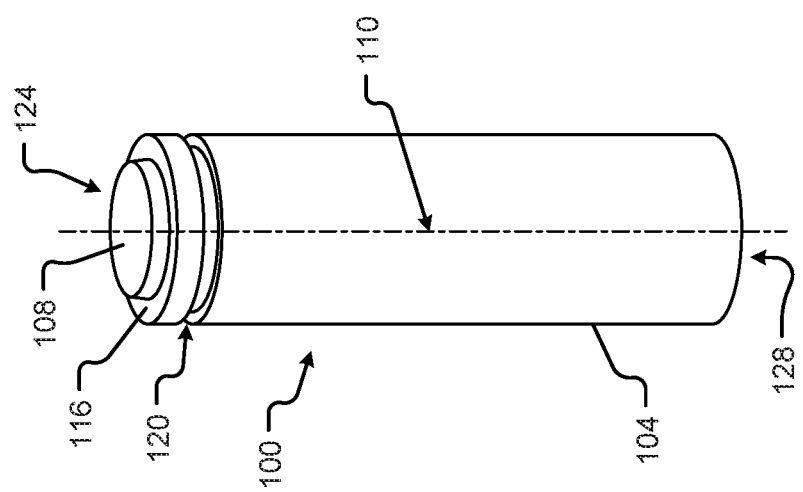
FIG. 1A is a perspective view of a battery cell in accordance with embodiments of the present disclosure.

FIG. 1B shows a perspective view of a weldable battery cell 100 including a terminal tab 112 connected to the first terminal 108. The terminal tab 112 may be connected to a busbar that extends between adjacent battery cells 100 in a battery module. In other configurations, the terminal tab 122 represents a portion of the busbar, where the other portions of the busbar are not shown. Regardless, the following description can be adapted to other types of busbars.

The terminal tab 112 is shown attached to the first terminal 108 at a first attachment point 114. In some configurations, the attachment may include welding, braz-ing, or soldering the terminal tab 112 to the first terminal 108 of the battery cell 100. Although shown as connected at the top 124 of the battery cell 100, the terminal tab 112 may be connected to different ends, portions, or areas, or parts of the battery cell 100 that are separated by at least one insulation area 116.

In some configurations, the terminal tab 112 may be configured as a flat solid metal connector. The flat solid metal connector may be made from a conductive material or coating including, but in no way limited to, copper, aluminum, gold, silver, platinum, iron, zinc, nickel, etc., and/or combinations thereof. In any event, the flat solid metal connector may be bent along an unattached portion of a planar surface of the tab 112 and configured to extend from at least one surface of the weldable battery cell 100. As shown in FIG. 1B, the terminal tab 112 may be bent to extend in the same axial direction, and/or parallel to the center axis 100, of the weldable battery cell 100.

Figure 1D:
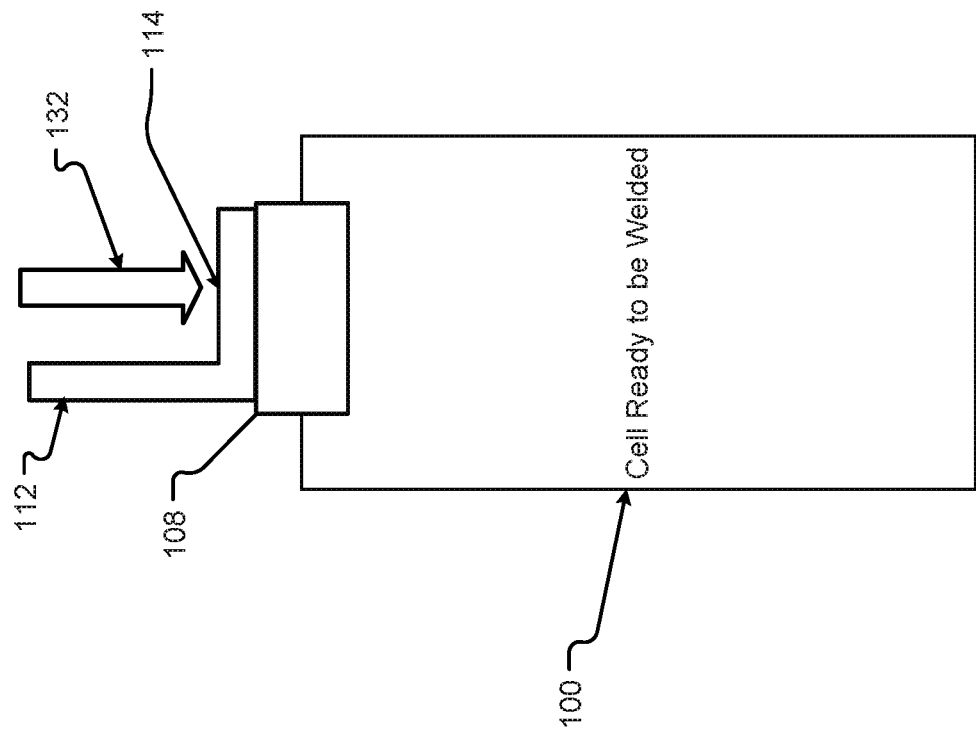
FIG. 1D shows the busbar of FIG. 1C in contact with the electrical cell of FIG. 1C and ready to be welded thereto in accordance with embodiments of the present disclosure.
Figure 1C:
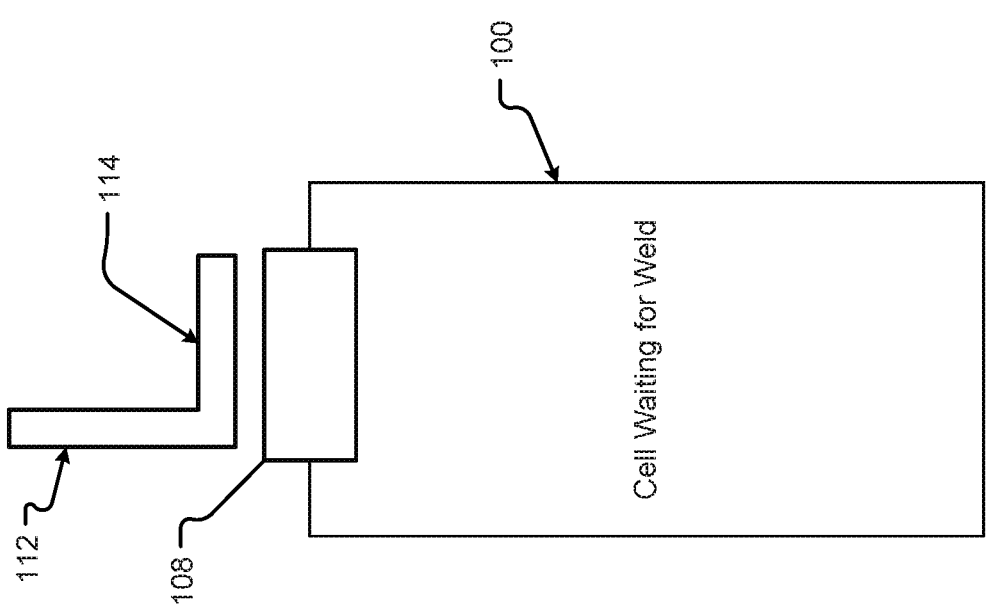
FIG. 1C shows a busbar prior to contact with an electrical cell in accordance with embodiments of the present disclosure.

FIGS. 1C and 1D depicts a terminal tab 112 ready for welding in accordance with embodiments of the present disclosure. The terminal tab 112, which is made from metal or another material with suitable electrical conductivity and suitable elasticity. In the depicted configuration of the terminal tab 112, the contact portion 114 is meant to attach substantially planar with the terminal 108. This configuration of the terminal tab 112 positions the terminal tab 112 so that when the contact point 114 is forced into a horizontal configuration (as discussed below) substantially parallel with the terminal 108, a force 132, shown in FIG. 1D, can physically contact the contact point 114 with the terminal and maintain the contact while the tab 112 is welded to the terminal 108. Thus, the forces 132 presses the tab 112 down on the terminal 108, thus improving the contact between the tab 120c and the terminal 108.

The welding operation begins with the relative movement of the terminal tab 112 and the cell 100 toward each other, with the tab 112 positioned substantially above the terminal 108. This arrangement may be accomplished by moving the cell 100 toward the stationary terminal tab 112, by moving the terminal tab 112 toward the stationary cell 100, or by moving both the terminal tab 112 and the stationary cell 100 toward each other. Before, at, or soon after the moment of contact between the terminal tab 112 and the terminal 108, a force 132 is applied to the tab 112. The force 132, in at least some configurations, is a magnetic force that pushes the tab 112 onto the terminal 108 or pulls the terminal tab 122 on the terminal 108.

Once the contact point 114 of the tab 112 achieves substantially planar contact with the terminal 108, the contact tab 112 can be welded to the terminal 108. The contact tab 112 may be laser welded to the terminal 108 or spot welded to the terminal 108. In some situations, the contact tab 112 may be affixed to the terminal 108 using means other than welding, including by the application of adhesive or the use of one or more mechanical fasteners.

Turning now to FIGS. 2A-2F, a terminal 112 (or busbar 112) and a cell 100 are pushed or pulled together by a magnetic force 132 to force the physical contact of the terminal 108 of the cell 100 with the tab/busbar 112 at contact point 114 in accordance with embodiments of the present disclosure. The welding operation involving the tab/busbar 112 begins with the relative physical movement of the tab/busbar 112 and the cell 100 toward each other (as shown in FIG. 1C), with the tab 112 positioned above the terminal 108 and in physical proximity thereto. As with the embodiment of FIGS. 1A-1D, this movement may be accomplished by moving the cell 100 toward the stationary tab/ busbar 112, by moving the tab/busbar 112 toward the stationary cell 100, or by moving both the tab/busbar 112 and the stationary cell 100 toward each other.

The various manufacturing systems or configurations 200 shown in FIGS. 2A-2F provide various arrangement of magnets 204 that may be deployed to create a magnetic force 132 that pushes or pulls the tab 112 onto the terminal 108. In some configurations, the core 224 is a permanent magnet without the need for the windings 212. The core 224 can be a ferromagnetic, ferromagnetic, paramagnetic, or other material that can provide magnetic properties, including one or more of, but not limited to, neodymium, iron, nickel, cobalt, montmorillonite, nontronite, biotite siderite (carbonate), pyrite, magnetite, hematite, ulvospinel, ilmenite, maghemite, jacobsite, trevorite, magnesioferrite, pyrrhotite, greigite, troilite, goethite, lepidocrocite, feroxyhyte, awaruite, wairauite, etc., or combinations thereof. Further, in some configurations, the material may be cooled or supercooled to promote or present a material's magnetic properties. If a permanent magnet 224, a separate jig may be placed over, around, and/or enclose the permanent magnet 224 to shield the magnetic force from other component when the magnet 224 is not used to push the tab 112 against the terminal 108.

Figure 2A:
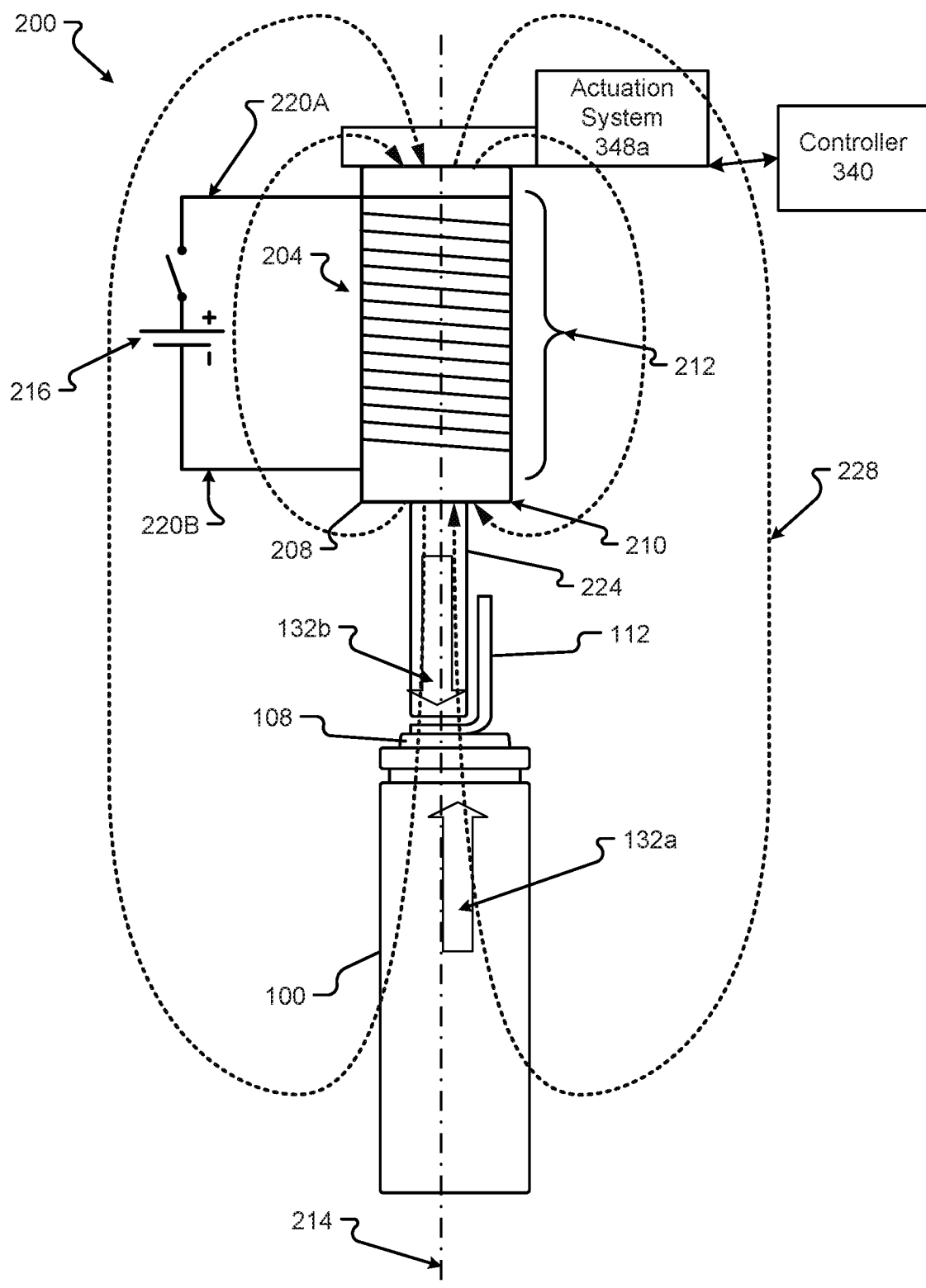
FIG. 2A shows a busbar being influenced by a magnetic force to contact the battery terminal cell and ready to be welded thereto in accordance with embodiments of the present disclosure.

As shown in FIG. 2A, the magnet 204 may be an electromagnet 208 having a set of windings 212 that surround a core 224. The windings 212 may be connected by connections 220A and 220B to an electrical source or electrical source 216. The amount of magnetic field generated by the magnet 204 can be configured by the number of windings 212 and the amount of voltage provided by the electrical source 216. The windings 212 and connections 220 can be any electrically conductive material, for example, copper or aluminum. The resistance of the material used for the windings 212 and connections 220 may also determine the amount of current flowing through the winding 212, which may also determine the amount of magnetic field generated. The core 224 (whether a permanent magnet or a core of the electromagnet) may also be movable along a longitudinal axis 214 within the body 210 and extending beyond the body 210 towards the cell 100.

The core 224 can extend the magnetic field, represented by lines 228, to the tab 112 and/or cell 100. Depending on the polarity of the electrical source 216, and thus, on magnetic field 228, the magnetic field 228 may push the tab 122 toward the terminal 108 or pull the cell 100, with the terminal 108, toward the tab 112. The tab 112, the terminal 108, and/or at least a portion of the cell 100 may be made from a magnetic material and react to the magnetic field 228. As such, the magnet 204 can apply a magnetic force 132 to the tab 112, the terminal 108, and/or the cell 100.

Different configurations of the manufacturing system 200 are possible. For example, the magnet 204 may be placed below the cell 100, as shown in FIGS. 2C and 2D. In this configuration, the magnet 204 may pull the tab 112 onto the terminal or push the cell 100 into the tab 112. Further, the manufacturing system 200 may use a jig 256, shown in FIGS. 2D through 2F. If neither the cell 100 nor the tab 112 are magnetic, which can occur in compounds such as copper or aluminum that are commonly used for electrical connections, the magnetic jig 256 can be placed over the tab 112 to react to the magnetic force 132 generated by the magnet 204. The jig 256 may have various forms and only an example of the jig 256 is shown in FIGS. 2D through 2F. A side view of the jig 256 is shown in FIG. 2D, while a top portion may be shown in FIG. 2E and a back portion in FIG. 2F. The jig 256 can include an indention 260, shown in FIG. 2E to place or arrange the tab 112. The jig 256 may also have a cavity 264, shown in FIG. 2E, that allows for a laser beam (described in FIGS. 3 and 4B) to pass through the jig 256 and weld the tab 112 to the terminal 108. Beyond using the jig 256, there are other ways to apply the magnetic force 132 to a non-magnetic tab 112 or cell 100.

Figure 2B:
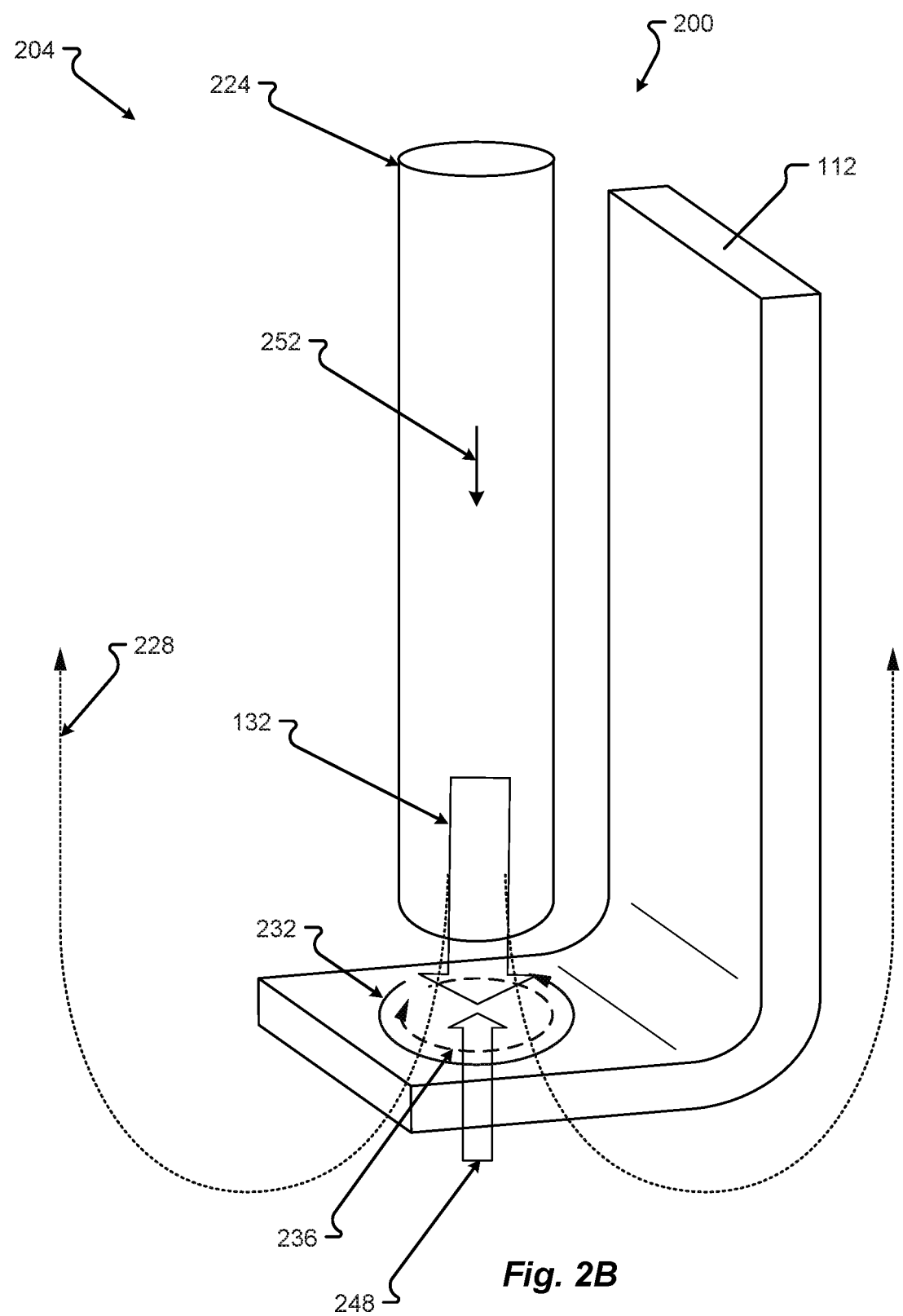
FIG. 2B shows a busbar being influenced by a magnetic force to contact the battery terminal cell and ready to be welded thereto in accordance with embodiments of the present disclosure.
Figure 2C:
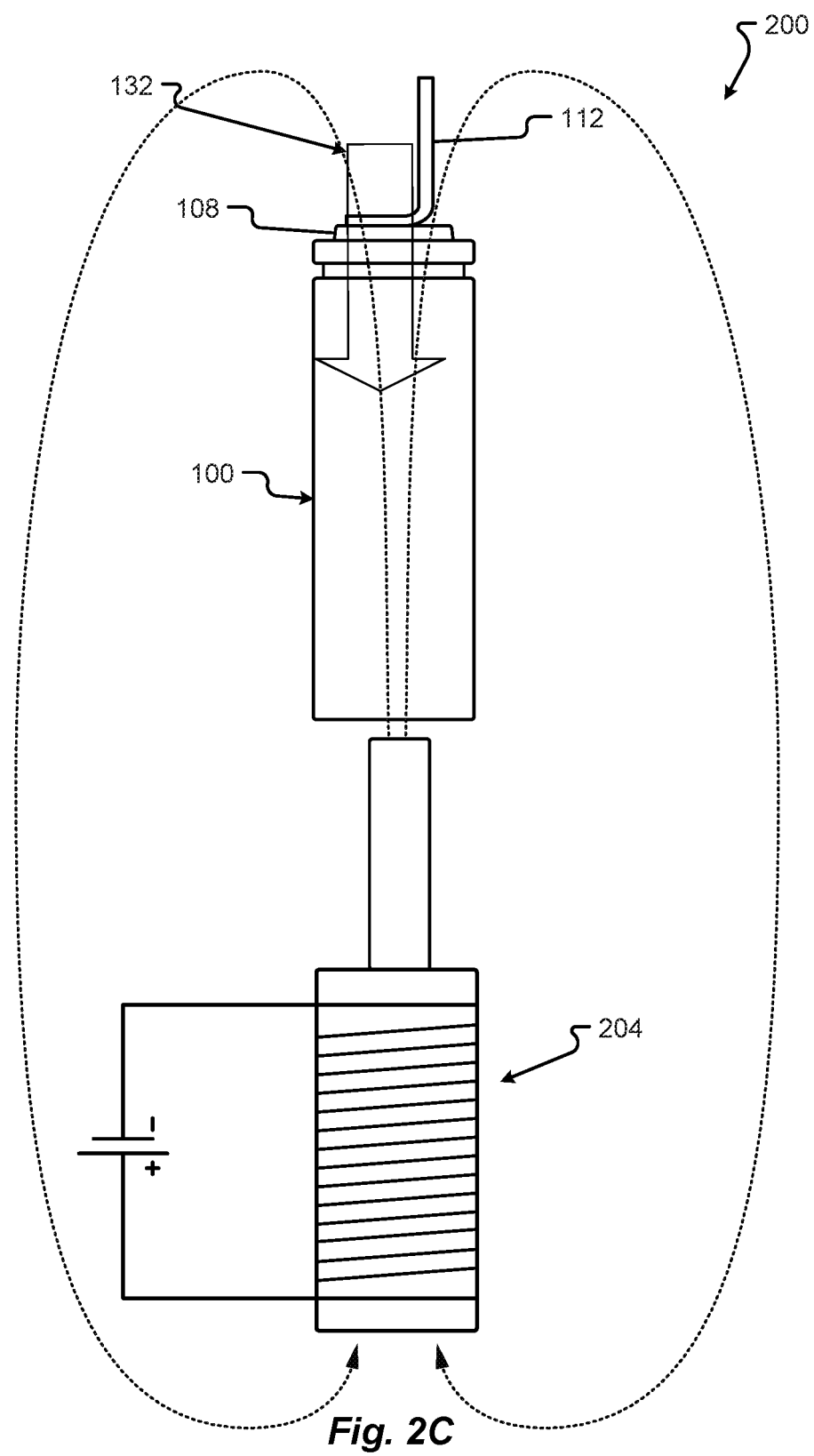
FIG. 2C shows a busbar being influenced by a magnetic force to contact the battery terminal cell and ready to be welded thereto in accordance with embodiments of the present disclosure.

In FIG. 2B, a configuration of the magnet 204 may employ Lenz's law to apply a magnetic force 132 to a non-magnetic tab 112. Lenz's law states that the direction of current induced in a conductor by a changing magnetic field due to Faraday's law of induction will be such that it will create a field that opposes the change that produced it. Thus, the core 224 may be movable in a direction 252 toward the tab 112. An actuator 348a (which may be the same or similar to the actuation system 348b described in conjunction with FIG. 3) can move the core 224 relative to the body 210 based on control signals from a controller 340 (see FIG. 3). The movement of the magnetic field 228 through the electrically conductive tab 112 can create an eddy current 236 in the tab 112. The eddy current 236, in turn, generates another magnetic field having an opposite polarity to the magnetic field 228. The interaction of the two, opposite magnetic fields generates a second magnetic force 248 that cause the tab 112 to repulse or be driven away from the core 224. Thus, by moving the core 224, the magnet 204 can cause the tab 112 to be forced into the terminal 108. The strength of the magnetic field 228 and the amount, acceleration, speed, etc. of the movement 252 can change the amount of force 248 is created to drive the tab 112 into the terminal 108. It should be noted that changing the movement 252, the polarity of the magnetic field 228, and/or position of the magnet 204 can generate an opposite reaction to that described above and call pull the cell 100 and tab 112 together. Further, in some configurations the magnetic field 228 may also generate an eddy current 236 in the terminal 108 or tab 112 that can generate a magnetic field 240 that pulls that is attracted to the magnetic field 228, which can pull the terminal 108 toward the tab 112. Other configurations are possible and contemplated.

As the contact portion 114 of the tab/busbar 112 contacts the terminal 108 of the cell 100, a magnetic force 132a and/or 132b pushes the tab/busbar 112 against the terminal 108. The relative movement of the cell 100 and the tab/busbar 112 stops after the tab/busbar 112 has been pushed against the terminal 108 enough to allow for welding, but before the tab/busbar 112 has been deformed beyond its elastic limit, which can be controlled by the strength of the magnetic field produced by the magnet 208. Possibly, because of the counter magnetic force generated by the tab 112 according to Lenz's law, the tab/busbar 112 attempts to push against the magnetic force of magnet 204, which results in a force that presses the tab 112 even more strongly against the terminal 108, thus further improving the contact between the tab/busbar 112 and the terminal 108.

The tab/busbar 112 may be sized according to the specific requirements of a given application, taking into consideration such factors as the voltage that will be applied across the tab/busbar 112; the current that will flow through the tab/busbar 112; and the temperatures to which the tab/busbar 112 will be exposed and at which the tab/busbar 112 will operate. Additionally, the tab/busbar 112 may be sized to achieve a desired reaction to the magnetic forces applied in the above configurations. Material selection for the busbars 120, 112 may depend on material properties such as the material's resistivity, magneticity, conductivity, and yield strength.

Figure 3:
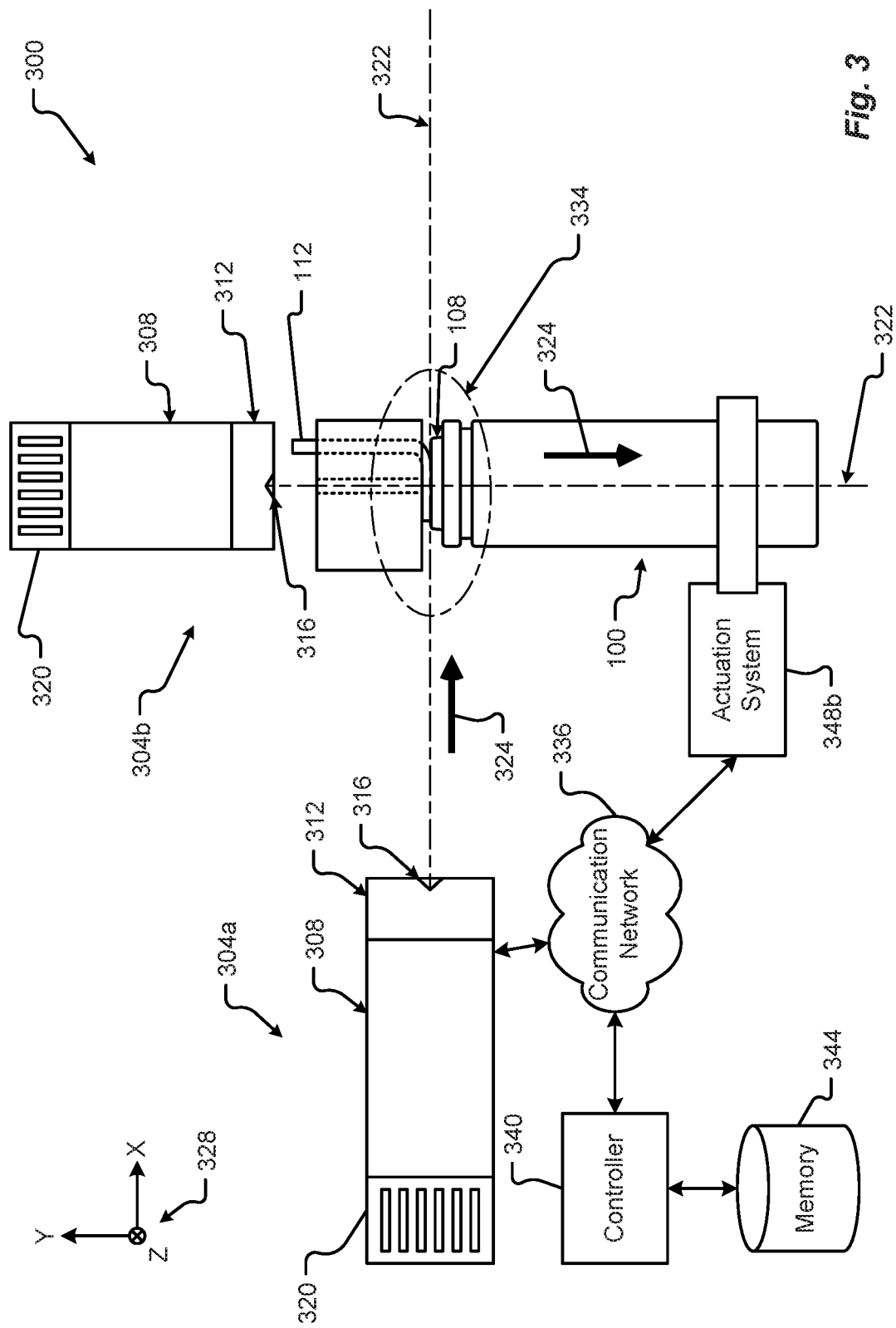
FIG. 3 is a block diagram of a laser welding system in accordance with embodiments of the present disclosure embodiment.

FIG. 3 is a schematic diagram of a laser welding system 300 in accordance with embodiments of the present disclosure embodiment. The laser welding system 300 may include a laser welder 304*a*/304*b* comprising a laser 308, a focusing element 312, an aperture 316, and a power supply 320. The laser welder 304 may be configured to convert electrical energy provided via the power supply 320 via the to generate a focusable laser beam that can be emitted from the aperture 316 through the focusing element 312. The focusing element 312 may comprise one or more lenses, filters, mirrors, etc., configured to adjust an intensity, focal point, and/or spread of the laser beam.

In some configurations, the laser welder 304 may be configured to emit a laser beam in an emission direction 324 running from the laser welder 304 toward the weldable battery cell 100. The laser beam may follow a substantially linear path defined by line 322. This linear path defines the location of the weld areas for the terminal tab 112 to the terminal 108.

Prior to laser welding, the weldable battery cell 100 may be positioned into contact with the terminal 108 via a force 224 that causes contact between the terminal tab 112 and the terminal 108. The position of the weldable battery cell 100 may be held in place by one or more end-effectors, clamps, fixtures, tools, etc., and/or the like. In some configurations, at least one position of the laser welder 304 may be fixed relative to the terminal 108, the weldable battery cell 100, combinations thereof, and/or some other reference datum. For instance, the laser welder 304 may be fixed in the Y-axis direction and/or X-axis direction (shown as the vertical and/or horizontal direction of the coordinate system 328 of FIG. 3) at a distance offset from the terminal 108. The offset distance may be used to define the location of the laser weld and/or the laser beam acting at an area of the terminal tab 112 and terminal 108. As provided above, the laser beam 304 may be positioned to emit a laser beam toward an area defined within a region of overlapped material (e.g., an overlap of the terminal 108 and terminal tab 112).

In some configurations, two or more weldable battery cells 100 may be disposed side-by-side along a length of a busbar. As shown in FIG. 3, the coordinate system 328 defines an X-axis running in a horizontal direction, a Y-axis running in a vertical direction, and a Z-axis running in a direction orthogonal and perpendicular to the X-Y plane shown (e.g., into and/or out of the page). It is anticipated that the two or more weldable battery cells 100 may be disposed side-by-side in the Z-axis direction. The arrangement of cells 100 along a length of the busbar and in the Z-axis direction can allow the laser welder 304 to stay fixed in the X-axis and/or Y-axis direction, align with the terminal tabs 112 of a first cell, perform the welding described herein, and index along the Z-axis direction to the terminal tabs of a second cell. Additionally or alternatively, the position of the laser welder 304 may remain fixed in the X-axis and/or Y-axis direction while moving to subsequent cells 100 disposed along a length of the busbar in the Z-axis direction.

As can be appreciated, the above example describes moving the laser welder 304 relative to the weldable battery cells 100 disposed along a length of the busbar. However, the present disclosure is not so limited. For instance, the laser welder 304 may remain fixed in all axes (e.g., the X-axis, Y-axis, and Z-axis) and the busbar and weldable battery cells 100 may move along the Z-axis between welding individual cells 100. It should be appreciated that the laser welder 304 can be positioned on other sides of the busbar to perform the welds. In other words, once the laser welder 304 is positioned on a side of the terminal 108 to completely weld the weldable battery cell 100 to the terminal 108, the laser welder 304 is not moved to the other side. This single-position for the laser welder 304 on one side of the terminal 108 and weldable battery cell 100 to perform multiple welds sequentially allows for fewer setups than compared with traditional welding operations. As provided above, traditional welding operations require the repositioning of a welder to complete all the connection welds for a single battery cell. This repositioning requires multiple setups to a welding system to weld a battery cell 100 to a busbar. The present disclosure describes making one setup to the position of the laser welder 304 to make both welds required to completely attach the weldable battery cell 100 to the terminal 108.

The movement, indexing, alignment, positioning, and/or orientation of one or more components of the laser welding system 300 described above may be performed by at least one actuation system 348. The actuation system 348 may include one or more grippers, actuators, robots, slides, rails, clamps, position-feedback devices, sensors, mechanisms, machines, and/or the like, etc. The actuation system 348 may be configured to move one or more components of the system 300 including, but in no way limited to, the weldable battery cell 100, the terminal 108, the laser welder 304, etc. In some configurations, the actuation system 348 and/or other components of the laser welding system 300 may receive instructions and/or commands from a controller 340.

One or more components of the laser welding system 300 (e.g., the laser welder 304, actuation system 348, etc.) may be operated, positioned, and/or otherwise controlled by a controller 340. The controller 340 may be a part of the laser welder 304 or located separately and apart from the laser welder 304. In any event, the controller 340 may include a processor and a memory 344. The memory 344 may be one or more disk drives, optical storage devices, solid-state storage devices such as a random access memory ("RAM") and/or a read-only memory ("ROM"), which can be programmable, flash-updateable and/or the like. The controller/processor 340 may comprise a general purpose programmable processor or controller for executing application programming or instructions related to the laser welding system 300. Furthermore, the controller/processor 340 can perform operations for configuring and transmitting/receiving information as described herein. The controller/processor 340 may include multiple processor cores, and/or implement multiple virtual processors. Optionally, the controller/processor 340 may include multiple physical processors. By way of example, the controller/processor 340 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

Examples of the processors 340 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In accordance with at least some embodiments of the present disclosure, the communication network 336 may comprise any type of known communication medium or collection of communication media and may use any type of protocols, such as SIP. TCP/IP, SNA, IPX, AppleTalk, and the like, to transport messages between endpoints. The communication network 336 may include wired and/or wireless communication technologies. The Internet is an example of the communication network 336 that constitutes an Internet Protocol (IP) network consisting of many computers, computing networks, and other communication devices located all over the world, which are connected through many telephone systems and other means. Other examples of the communication network 336 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 336 need not be limited to any one network type, and instead may be comprised of a number of different networks and/or network types. The communication network 336 may comprise a number of different communication media such as coaxial cable, copper cable/wire, fiber-optic cable, antennas for transmitting/receiving wireless messages, and combinations thereof.

Figure 4A:
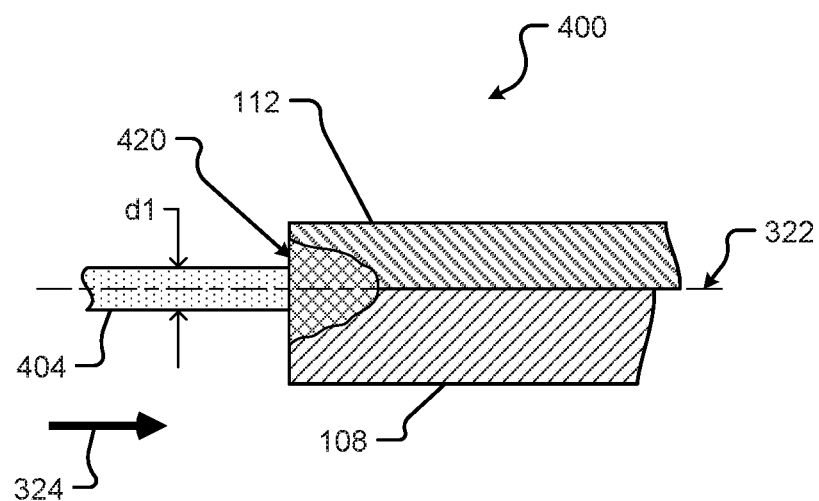
FIG. 4A is a detail partial section view showing a first battery cell terminal tab welding to a first busbar terminal in accordance with embodiments of the present disclosure.
Figure 4B:
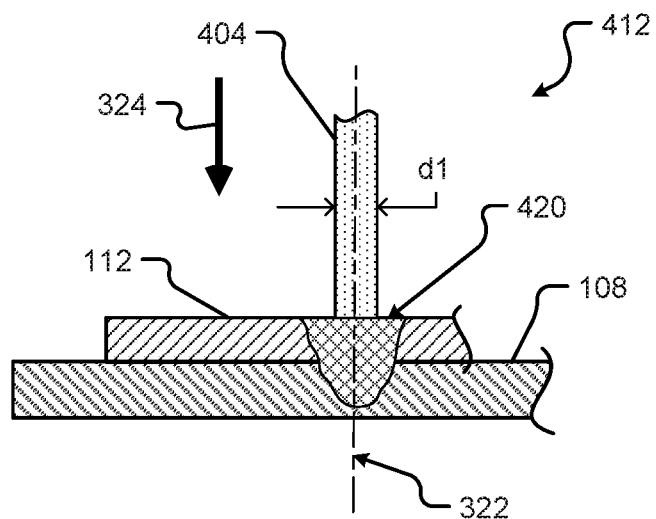
FIG. 4B is a second detail partial section view showing a first battery cell terminal tab welding to a first busbar terminal in accordance with embodiments of the present disclosure.

FIGS. 4A-4B show section views illustrating a first and second weld operation 400, 412 of the terminal tab 112 in a detail area 334 (see FIG. 3) in accordance with embodiments of the present disclosure. The laser weld beam 404 is generated along a laser beam path 322 in a direction 324 toward the contact area between the terminal tab 112 and the terminal 108. The first configuration 400 shows that the terminal tab 112 and terminal 108 are disposed in the same plane and in a line with the laser beam path 322. In some configurations, the middle of the flat planar surface of the terminal tab 112 is aligned with the middle of the flat planar surface of the terminal 108 and in the same plane as the laser beam path 322.

Referring to FIG. 4A, the laser weld beam 404 is shown directed toward the terminal tab 112 and terminal 108 in an emission direction 324. The laser weld beam 404 may have a first focus or diameter, d1, at the first welding area 420. Upon contacting the terminal tab 112 and terminal 108, the laser weld beam 404 rapidly heats the material of the terminal tab 112 and terminal 108. The heat generated by the laser weld beam 404 causes the material of both the terminal tab 112 and terminal 108 to melt and flow together. This interaction between the melted materials at the terminal tab 112 and terminal 108 causes the materials to combine and join to one another. In some configurations, the diameter, d1, of the laser weld beam 404 may define the size and formation of the penetration of the weld at the first welding area 420. As shown in FIG. 4A, the penetration of the weld is shown gradually tapering from a first size to a reduced second size in the emission direction 324.

FIG. 4B shows a view of a laser weld beam 404 configured to weld the terminal tab 112 and terminal 108 by penetrating the tab 112 to create a path to the terminal. The focused laser weld beam 404 passes, at least partially, through the tab 112 to reach the material of the terminal 108. Upon reaching the terminal material 108, the focused laser weld beam 404 rapidly heats the material of the second battery cell terminal 108 and the material of the terminal tab 112. The heat generated by the focused laser weld beam 404 causes the material of both of the terminal tab 112 and terminal 108 to melt and flow together. Similar to the first weld shown in FIG. 4A, this interaction between the melted materials at the second welding area 420 shown in FIG. 4B causes the terminal tab 112 and terminal 108 to combine and join to one another. The laser weld bean 404 shown in FIG. 4B may pass through the jig 256 to create the weld 420.

Figure 5A:
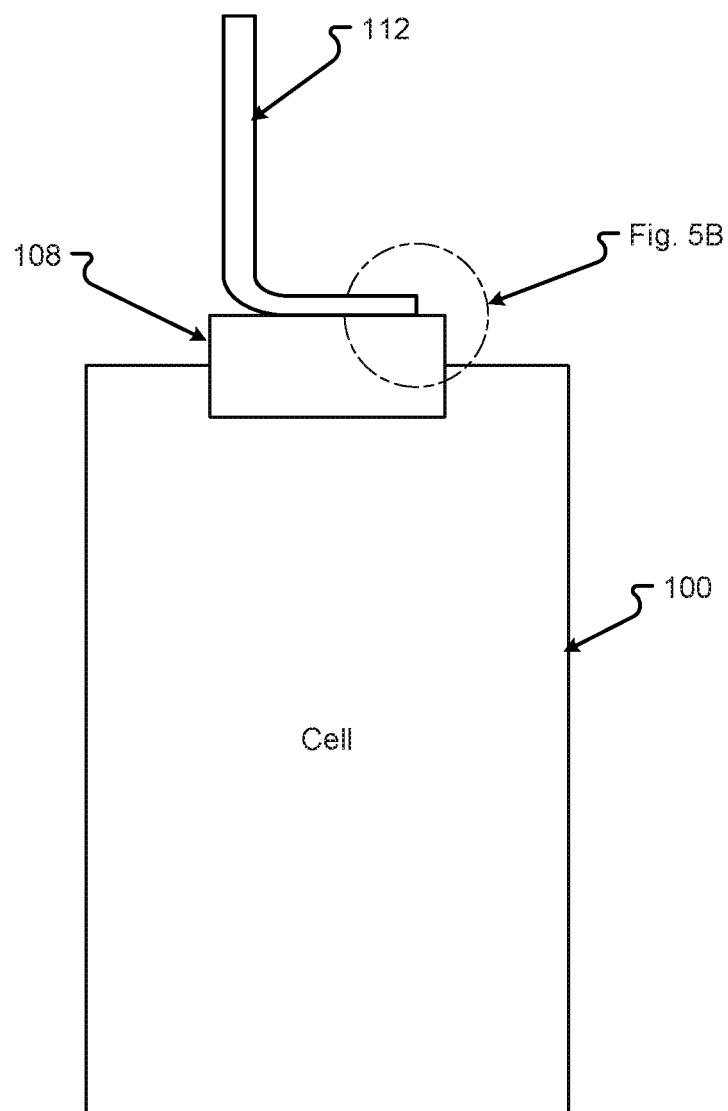
FIG. 5A shows a busbar in general contact with an electrical cell in accordance with embodiments of the present disclosure.
Figure 5B:
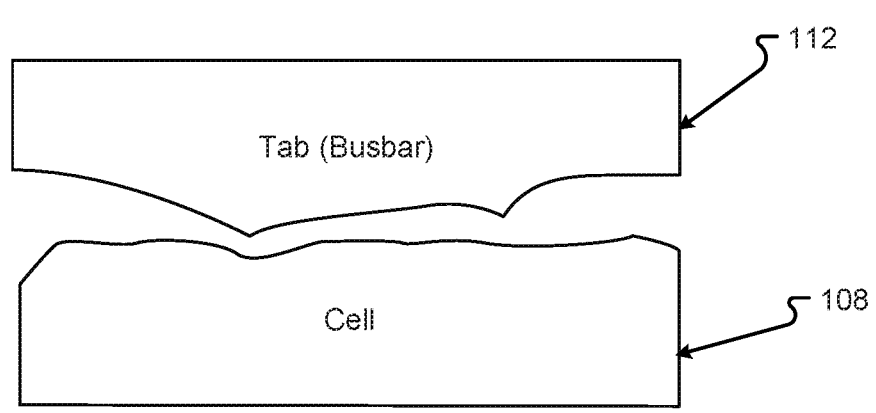
FIG. 5B shows an enlarged view of contact area between the busbar and the electrical cell of FIG. 5A in accordance with embodiments of the present disclosure.

Referring now to FIGS. 5A and 5B, the use of a tab 112 (or, alternatively, a busbar) to ensure planar contact with the terminal 108 of a cell 100 may still not provide a desired quality of contact between the tab 112 and the terminal 108 depending on the existence, size and configuration of microdeformities in the tab 112 and/or the terminal 108. When laser welding is used to attach the tab 112 to the terminal 108, the laser 404 must be focused on a point of actual contact between the tab 112 and the terminal 108. However, the presence of microdeformities may prevent the identification of an area of actual contact between the tab 112 and the terminal 108.

Figure 6:
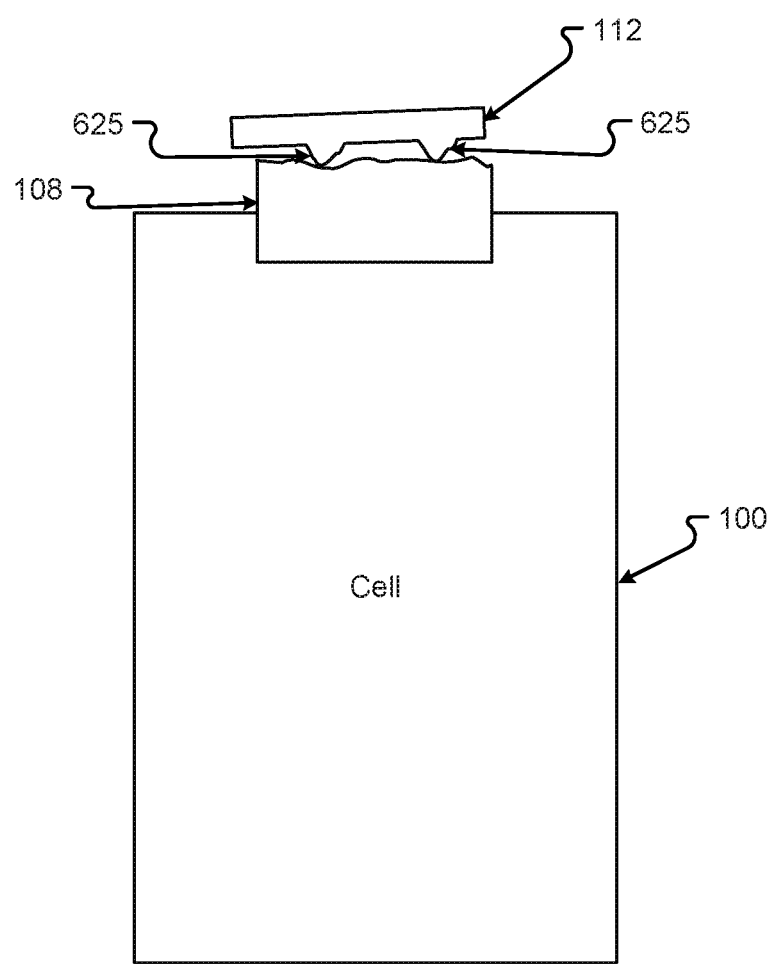
FIG. 6 shows a busbar contact with an electric cell in accordance with embodiments of the present disclosure.

With reference now to FIGS. 6 thorough 7B, to ensure that areas of actual contact are both identifiable and predictable, a tab 112 may comprise at least two protrusions or dimples 625 in a bottom surface of the tab 112 in accordance with embodiments of the present disclosure. Then, when the cell 100 and the tab 112 are moved toward each other by the effect of the magnetic force, the dimples 625 will contact the terminal 108 first, and will remain in contact with the terminal 108 as magnetic force causes the tab 112 to be pressed against the terminal 108. Because the dimples 625 may be stamped in the same place on every tab 112, the dimples 625 provide known locations of actual contact between the tab 112 and the terminal 108. Consequently, the laser beam 404 used for laser welding can be focused first on a dimple 625, thus improving the quality of the resulting weld.

Figure 7A:
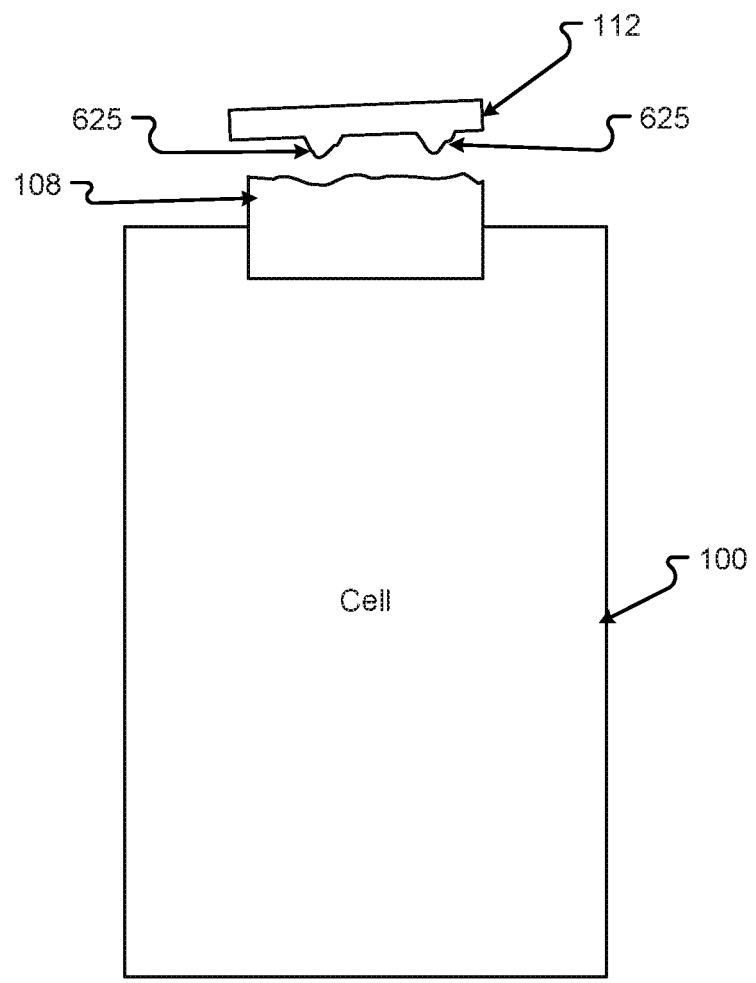
FIG. 7A also shows a busbar contact with an electric cell in accordance with embodiments of the present disclosure.
Figure 7B:
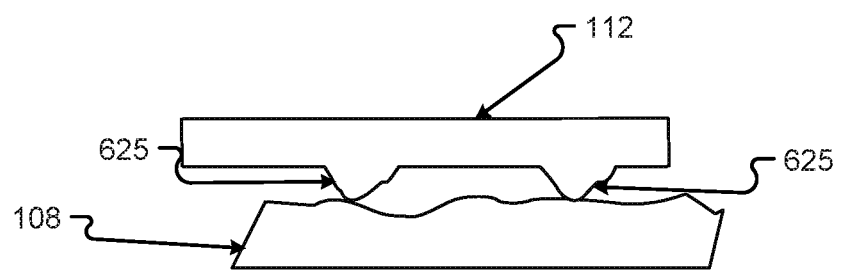
FIG. 7B shows an enlarged view of a contact area between a busbar and an electric cell in accordance with embodiments of the present disclosure.

Importantly, the size of the dimples 625 in FIGS. 6 and 7B has been exaggerated for illustrative purposes. The size of the dimples 625 may be significantly smaller than the height of the tab 112. For example, the dimples 625 may protrude only a fraction of a millimeter downwardly from the bottom surface of the tab 112. The dimples 625 may be stamped into the tab 112, although other manufacturing processes may also be used to create the dimples 625. Additionally, although FIGS. 6 and 7B show a depression in an upper surface of the contact tab 108 below the dimples 625, the dimples 625 may or may not coincide with such depressions.

Figure 8:
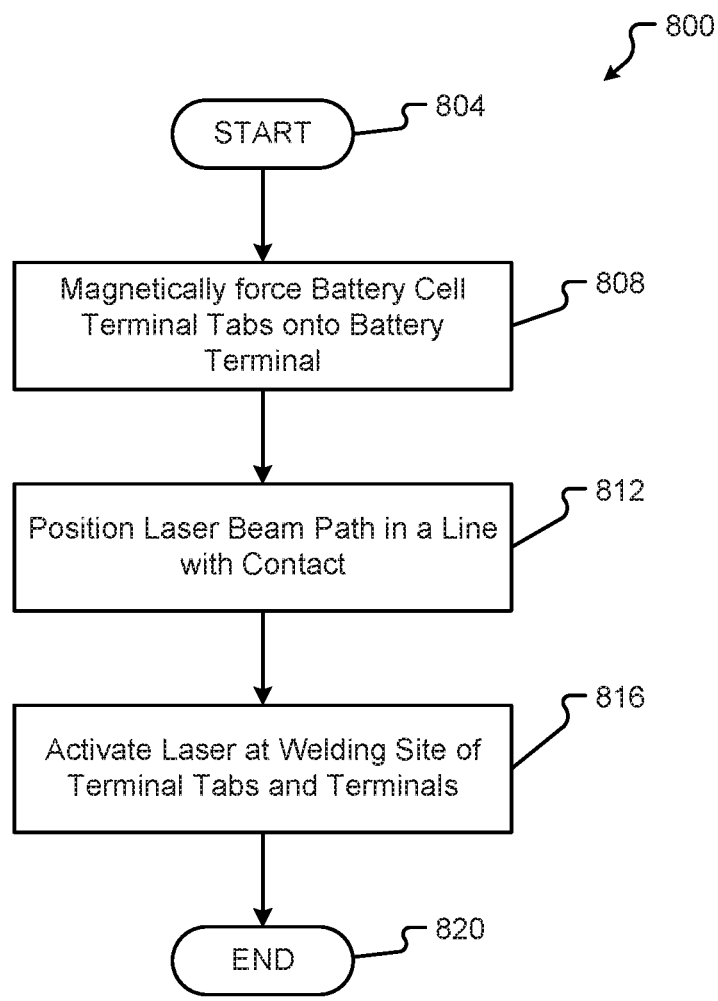
FIG. 8 provides a flowchart for a method of welding a busbar to an electric cell in accordance with embodiments of the present disclosure.

FIG. 8 is a flow diagram of a method 800 for laser welding a terminal tab 112 to a terminal 108 of a battery cell 100 in accordance with embodiments of the present disclosure. While a general order for the steps of the method 800 is shown in FIG. 8, the method 800 can include more or fewer steps or can arrange the order of the steps differently than those shown in FIG. 8. Generally, the method 800 starts with a start operation 804 and ends with an end operation 820.

The method 800 can be executed as a set of computer-executable instructions executed by a controller 340, and/or computer system, and encoded or stored on a computer readable medium or memory 344. Hereinafter, the method 800 shall be explained with reference to the systems, components, assemblies, devices, environments, etc. described in conjunction with FIGS. 1-7B.

The method 800 begins at step 804 and proceeds by positioning the weldable battery cell 100 in physical proximity to the terminal tab 112 (or busbar) in accordance with embodiments of the present disclosure. In some configurations, this positioning may be provided via an actuation system 348. For example, the weldable battery cell 100 may be held and moved into position by a robotic end-effector of the actuation system 348. As another example, the terminal tab 112 may be positioned into contact with the weldable battery cell 100 via one or more linear actuators and/or robots. In any event, the contact position of the tab 112 includes aligning the battery cell terminal 108 with the busbar or terminal ab 112. The alignment includes positioning the tab 112 in physical proximity to and over the terminal 108, as shown in FIG. 7A.

Then, a magnetic force may be applied to the terminal tab 112, the cell 100, both the terminal tab 112 and the cell 100, and/or a jig 256, in step 808. As explained in conjunction with FIGS. 2A though 2F, a magnet can create a magnetic force 132 that can cause the tab 112 to be driven into contact with the terminal 108. The magnetic force 132 can be applied while the welding process is on-going. In some configurations, such as when the magnet 204 creates a reaction according to Lenz's law (explained in conjunction with FIG. 2B), the magnetic force 132 may be periodically applied by moving the core 224 and turning the power on and off to the magnet, such that the core 224 only move in one direction creating only a single reaction to the tab 112 or cell 100. In these situations, an actuator 348a can time the movement of the core, the powering of the windings 212 from the electrical source 216 to when the welding is occurring. In this way, the magnet 204 forces the tab 112 into contact with the terminal 108 and the correct time for the welding.

Next, the method 800 continues by positioning the sets of contacting terminal tab 112 and terminal 108 in a line with the laser beam path 322 of a laser welder 304, in step 812. In particular, the contact points (possibly tabs 625) of the terminal tab 112 and terminal 108 are disposed in a line with the laser beam path 322 such that a laser weld beam 404 emitted in an emission direction 324 toward the contact point 625 of the terminal tab 112 and terminal 108 can create welds of the terminal tab 112 and terminal 108.

In some configurations, the terminal tab 112 and terminal 108 may be moved (e.g., via an actuation system 348, etc.) into the laser beam path 322 (e.g., associated with a fixed or pre-positioned laser welder 304, etc.). In one situation, the laser welder 304 and laser beam path 322 may be moved such that the laser beam path 322 intersects with each overlapped contact region 625 of the terminal tab 112 and terminal 108 (e.g., where the contacted terminal tab 112 and terminal 108 are maintained in a fixed or pre-positioned location, etc.).

The method 800 proceeds by activating the laser welder 304, in step 816. The focus may define a focus site of the emitted laser weld beam 404. In some configurations, the first diameter, d1, may correspond to a diameter of the beam at a particular focal length or distance from the aperture 316 of the laser welder 304. For instance, this particular focal length may correspond to the distance between the terminal tab 112 and terminal 108 generated by the application of the magnetic force. In this step, the laser weld beam 404 is emitted in a single linear emission direction 324 toward the terminal tab 112 and terminal 108 and welds the terminal tab 112 to the terminal, as explained in conjunction with FIGS. 3 through 4B.

The features of the various embodiments described herein are not intended to be mutually exclusive. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

The systems and methods of this disclosure have been described in relation to the connection of a busbar to an electrical cell. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments of the present disclosure include a welding system, comprising: a magnet within physical proximity to a tab, a busbar, and/or or a battery cell which can emit a magnetic field that causes a magnetic force to be applied to the tab, the busbar, and/or the battery cell; a welder configured weld the tab or the busbar to a terminal of the battery cell; a controller, configured to: present the magnet in physical proximity to the tab, a busbar, and/or or a battery cell to produce a magnetic force causes the tab or busbar to come into physical contact with the terminal of the battery cell; while the magnetic force causes the tab or busbar to come into physical contact with a terminal of the terminal of the battery cell, activate the welder to weld the tab or busbar to the terminal of the battery cell.

Any of the one or more of the above aspects, wherein the welder is a laser welding system.

Any of the one or more of the above aspects, wherein the controller activates a laser produced by the laser welding system to weld the tab or busbar to the terminal of the battery cell.

Any of the one or more of the above aspects, wherein the magnet is an electromagnet.

Any of the one or more of the above aspects, wherein the controller activates a switch that provides power to a winding of the electromagnet.

Any of the one or more of the above aspects, wherein the controller activates the switch when the tab or busbar are in physical proximity to the terminal of the battery cell but before the controller activates the welder.

Any of the one or more of the above aspects, wherein the controller maintains power to the electromagnet while the weld is completed.

Any of the one or more of the above aspects, wherein the electromagnet includes a core that comes into physical proximity to the tab or busbar to create the magnetic force.

Any of the one or more of the above aspects, wherein the core is moved toward the tab or bus bar to create a force according to Lenz's law.

Any of the one or more of the above aspects, wherein the magnet pulls the tab or busbar onto the terminal of the battery cell.

Embodiments of the present disclosure include a welding method, comprising: providing a tab to be welded to a terminal of a battery cell; providing the battery cell comprising the terminal; moving the tab or battery cell such that the tab is in physical proximity to the terminal; providing a magnet; when the tab is within physical proximity of the terminal, moving the magnet in physical proximity to the tab and/or or a battery cell to produce a magnetic force that causes the tab to come into physical contact with the terminal of the battery cell; and while the magnetic force causes the tab to come into physical contact with the terminal of the battery cell, activating, via a controller, a laser welder causing the laser welder to emit a laser weld beam that welds the tab to the terminal.

Any of the one or more of the above aspects, wherein the magnet is an electromagnet, and wherein the controller activates a switch that provides power to a winding of the electromagnet.

Any of the one or more of the above aspects, wherein the controller activates the switch when the tab is in physical proximity to the terminal of the battery cell but before the controller activates the welder.

Any of the one or more of the above aspects, wherein the controller maintains power to the electromagnet while the weld is completed.

Any of the one or more of the above aspects, wherein the electromagnet includes a core that comes into physical proximity to the tab to create the magnetic force.

Any of the one or more of the above aspects, wherein the core is moved toward the tab or bus bar to create a force according to Lenz's law, and wherein the magnet pulls the tab onto the terminal of the battery cell.

Embodiments of the present disclosure include a method of manufacturing a laser welded battery cell and busbar connection, comprising: providing a tab to be welded to a terminal of a battery cell; providing the battery cell comprising the terminal; moving the tab or battery cell such that the tab is in physical proximity to the terminal; providing a magnet; when the tab is within physical proximity of the terminal, moving the magnet in physical proximity to the tab and/or or a battery cell to produce a magnetic force that causes the tab to come into physical contact with the terminal of the battery cell; and while the magnetic force causes the tab to come into physical contact with the terminal of the battery cell, activating, via a controller, a laser welder causing the laser welder to emit a laser weld beam that welds the tab to the terminal.

Any of the one or more of the above aspects, wherein the magnet is an electromagnet, wherein the controller activates a switch that provides power to a winding of the electromagnet, and wherein the controller activates the switch when the tab is in physical proximity to the terminal of the battery cell but before the controller activates the welder.

Any of the one or more of the above aspects, wherein the controller maintains the position of the magnet while the weld is completed.

Any of the one or more of the above aspects, wherein the electromagnet includes a core that comes into physical proximity to the tab to create the magnetic force, wherein the core is moved toward the tab or bus bar to create a force according to Lenz's law, and wherein the magnet pulls the tab onto the terminal of the battery cell.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A contactless welding system, comprising:
   a magnet disposed on a first side of a battery cell, wherein the first side of the battery cell is arranged opposite a second side of the battery cell, and wherein the magnet emits a magnetic field that causes a magnetic force to be applied to a tab for the battery cell;
a laser welder disposed on the second side of the battery cell, the laser welder configured to weld, via a laser beam emitted from the laser welder, the tab to a terminal disposed on the second side of the battery cell;
a controller, configured to:
send a control signal to an actuator and move a position of the magnet relative to the battery cell producing the force that causes the tab to come into physical contact with the terminal of the battery cell without touching the tab or the terminal of the battery cell with the magnet or other physical member; and
while the magnetic force causes the tab to come into physical contact with the terminal of the battery cell, activate the laser welder to weld the tab to the terminal of the battery cell from the second side of the battery cell, via the laser beam emitted from the laser welder.

2. The contactless welding system of claim 1, wherein the tab comprises at least two protrusions extending from a surface of the tab, and wherein the tab is caused to come into physical contact with the terminal of the battery cell at a surface of each of the at least two protrusions and a surface of the terminal of the battery cell.

3. The contactless welding system of claim 2, wherein activating the laser welder further comprises:
focusing, by the controller, the laser beam emitted from the laser welder on an area of the tab comprising the at least two protrusions.

4. The contactless welding system of claim 1, wherein the magnet is an electromagnet.

5. The contactless welding system of claim 4, wherein the controller activates a switch that provides power to a winding of the electromagnet.

6. The contactless welding system of claim 5, wherein the controller activates the switch when the tab is presented in physical proximity to the terminal of the battery cell but before the controller activates the welder.

7. The contactless welding system of claim 6, wherein the controller maintains power to the electromagnet while the weld is completed.

8. The contactless welding system of claim 7, wherein the electromagnet includes a core disposed on the first side of the battery cell that moves along a longitudinal axis of a body of the battery cell in a direction toward the tab without contacting the battery cell.

9. The contactless welding system of claim 8, wherein the core is moved in the direction toward the tab to create a force according to Lenz's law.

10. The contactless welding system of claim 1, wherein the magnet pulls the tab onto the terminal of the battery cell.

11. A contactless welding method, comprising:
providing a tab to be welded to a terminal of a battery cell;
providing the battery cell comprising the terminal;
moving the tab or battery cell such that the tab is in physical proximity to the terminal of the battery cell;
providing a magnet disposed on a first side of the battery cell, wherein the first side of the battery cell is arranged opposite a second side of the battery cell, and wherein the tab is disposed on the second side of the battery cell;
when the tab is within physical proximity of the terminal, moving a position of the magnet relative to the battery cell producing a magnetic force that causes the tab to come into physical contact with the terminal without touching the tab or the terminal with the magnet or other physical member; and
while the magnetic force causes the tab to come into physical contact with the terminal of the battery cell, activating, via a controller, a laser welder causing the laser welder to emit a laser weld beam that welds the tab to the terminal of the battery cell at the second side of the battery cell.

12. The contactless welding method of claim 11, wherein the magnet is an electromagnet, wherein the controller activates a switch that provides power to a winding of the electromagnet, and wherein the laser welder is disposed on the second side of the battery cell.

13. The contactless welding method of claim 12, wherein the controller activates the switch when the tab is moved in physical proximity to the terminal of the battery cell but before the controller activates the laser welder.

14. The contactless welding method of claim 13, wherein the controller maintains power to the electromagnet while the weld is completed.

15. The contactless welding method of claim 12, wherein the electromagnet includes a core disposed on the first side of the battery cell that moves along a longitudinal axis of a body of the battery cell in a direction toward the tab without contacting the battery cell.

16. The contactless welding method of claim 15, wherein the core is moved in the direction toward the tab to create a force according to Lenz's law, and wherein the electromagnet pulls the tab onto the terminal of the battery cell.

17. A method of manufacturing a laser welded battery cell and busbar connection, comprising:
providing a connector, wherein the connector is metal, and wherein the connector includes a bent portion configured to be welded to a terminal of a battery cell;
providing the battery cell comprising the terminal, wherein the battery cell comprises a first side and a second side disposed opposite the first side, wherein the first side and the second second side of the battery cell;
moving the connector or battery cell such that the bent portion of the connector is substantially parallel and in physical proximity to the terminal at the second side of the battery cell;
providing a magnet disposed on the first side of the battery cell;
when the bent portion of the connector is within physical proximity of the terminal, moving a position of the magnet relative to the battery cell producing a magnetic force that causes the bent portion of the connector to come into physical contact with the terminal of the battery cell without touching the tab or the terminal of the battery cell with the magnet or any other physical member; and
while the magnetic force causes the bent portion of the connector to come into physical contact with the terminal of the battery cell, activating, via a controller, a laser welder causing the laser welder to emit a laser weld beam that welds a portion of the bent portion of the connector to the terminal of the battery cell at the second side of the battery cell.

18. The method of manufacturing of claim 17, wherein the magnet is an electromagnet, wherein the controller activates a switch that provides power to a winding of the electromagnet, and wherein the controller activates the switch when the bent portion of the connector is in physical proximity to the terminal of the battery cell but before the controller activates the laser welder.

19. The method of manufacturing of claim 17, wherein the controller maintains the position of the magnet while the laser welder emits the laser weld beam.

20. The method of manufacturing of claim 18, wherein the electromagnet includes a core disposed on the first side of the battery cell that moves along a longitudinal axis of a body of the battery cell in a direction toward the tab to create a force according to Lenz's law, and wherein the magnet pulls the bent portion of the connector onto the terminal of the battery cell.

* * * * *

UNITED STATES PATENT AND TRADEMARK OFFICE
CERTIFICATE OF CORRECTION

PATENT NO. : 10,668,578 B2
APPLICATION NO. : 15/492922
DATED : June 2, 2020
INVENTOR(S) : Austin L. Newman Page 1 of 1

It is certified that error appears in the above-identified patent and that said Letters Patent is hereby corrected as shown below:

On the Title Page

Replace item (71) with NIO USA, Inc., San Jose, CA (US)

In the Claims

Claim 1, Column 15, Line 10, delete "force" and insert --magnetic force-- therein
Claim 17, Column 17, Line 36, after "first side and the second" insert --side are separated by a body of the battery cell, and wherein the terminal is disposed on the-- therein Signed and Sealed this
Twenty-first Day of July, 2020

Andrei Iancu
*Director of the United States Patent and Trademark Office*